C. S. PELTON.
CONTROL VALVE FOR MOTOR CAR HEATERS.
APPLICATION FILED FEB. 25, 1922.
1,437,910.
Patented Dec. 5, 1922.
3 SHEETS—SHEET 1.
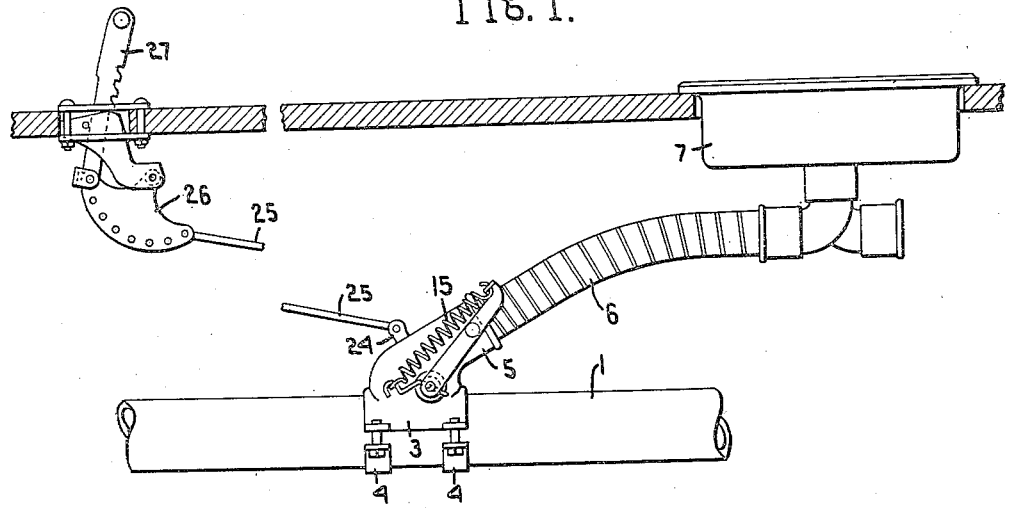
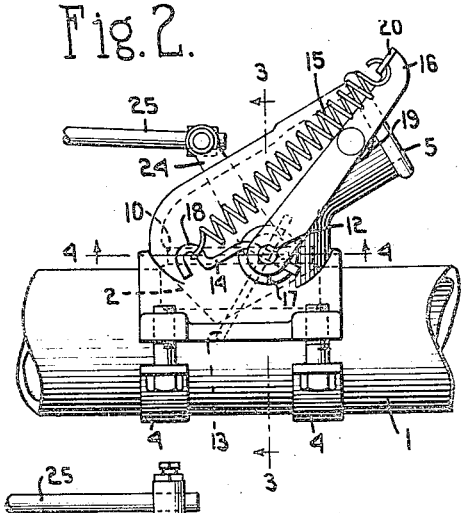
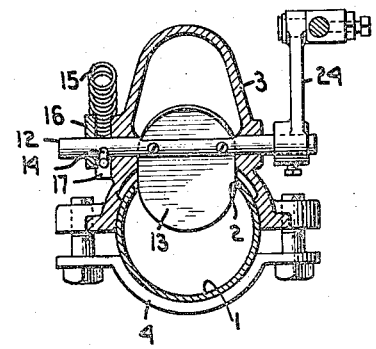
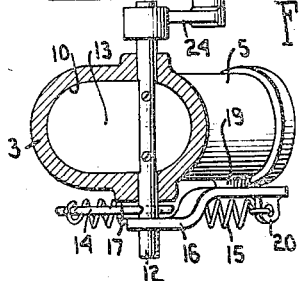
Clyde S. Pelton
INVENTOR.
BY
*Harold Elmo Smith* ATTORNEY.

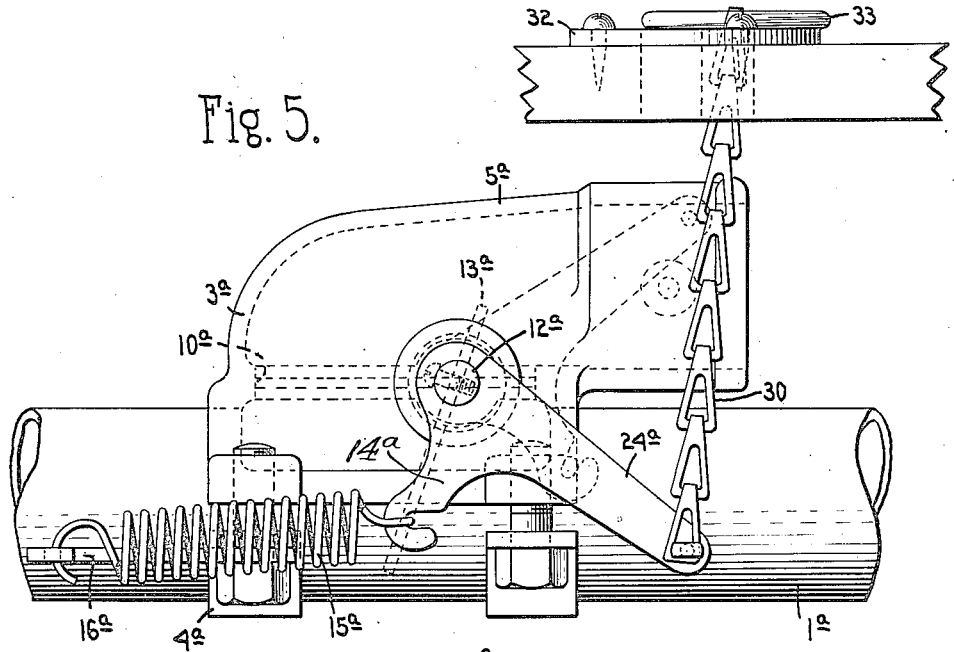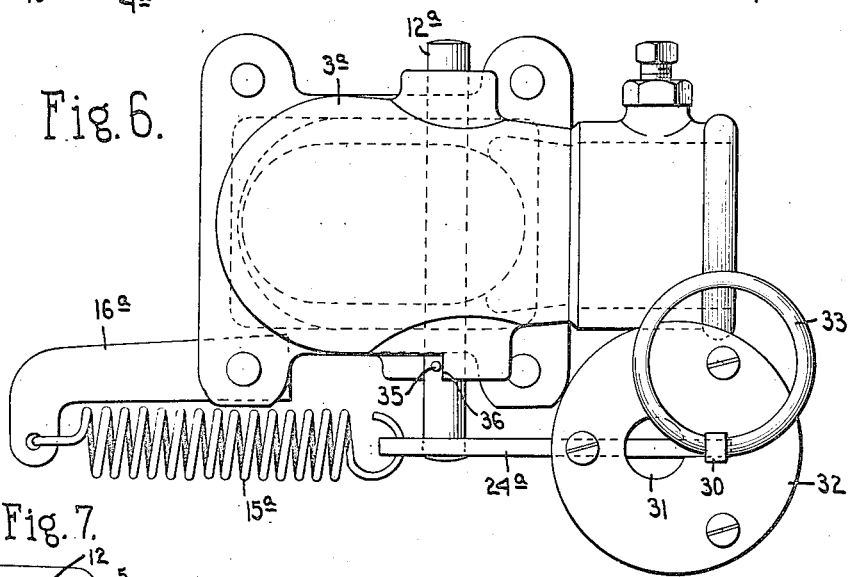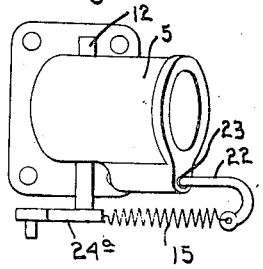

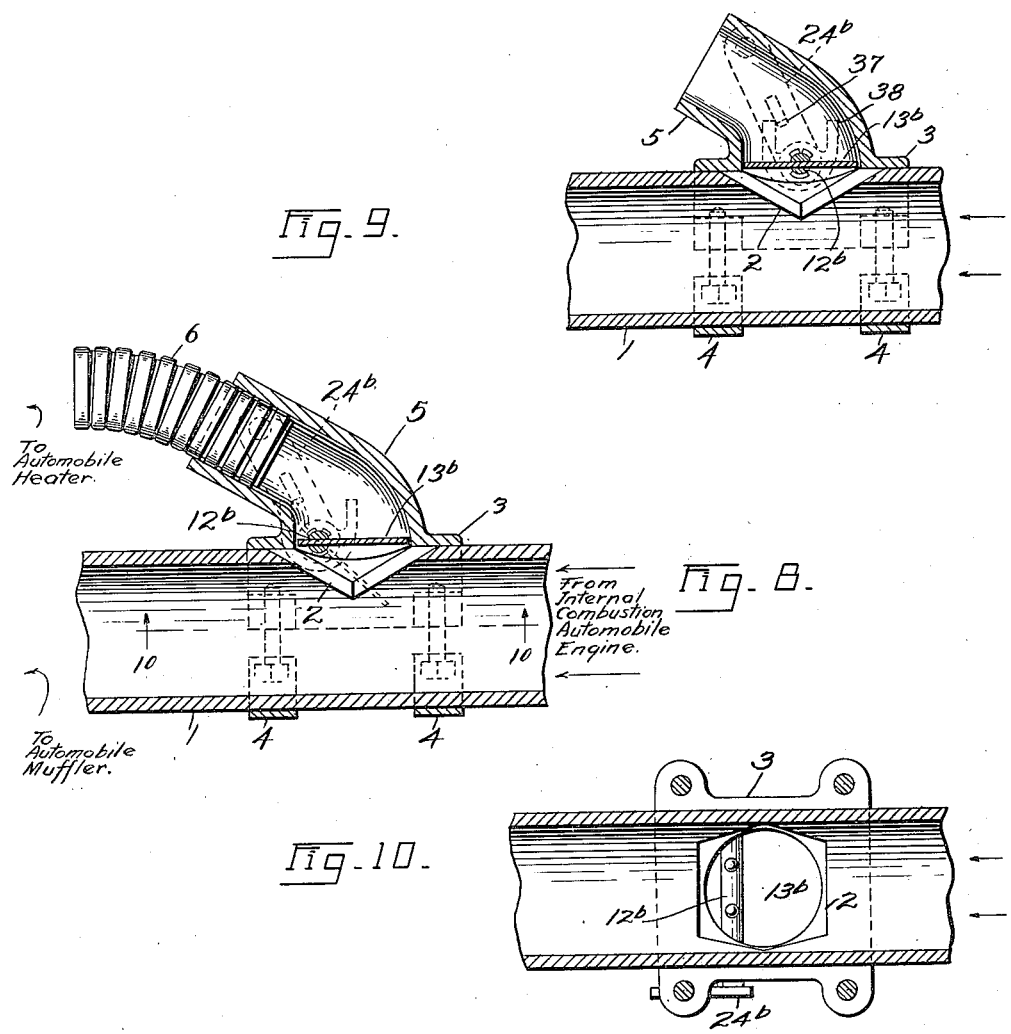

Patented Dec. 5, 1922.

1,437,910

UNITED STATES PATENT OFFICE.

CLYDE S. PELTON, OF CLEVELAND HEIGHTS, OHIO.

CONTROL VALVE FOR MOTOR-CAR HEATERS.

Application filed February 25, 1922. Serial No. 539,216.

*To all whom it may concern:*

Be it known that I, CLYDE S. PELTON, a citizen of the United States, residing at Cleveland Heights, in the county of Cuyahoga and State of Ohio, have invented a certain new and useful Improvement in Control Valves for Motor-Car Heaters, of which the following is a full, clear, and exact description, reference being had to the accompanying drawings.

This invention relates to heaters for motor propelled vehicles and has for its object the provision of a new and improved control valve which shall be inexpensive to make, simple and reliable in construction, which shall serve to deflect into the heater a considerable proportion of the gases passing through the exhaust pipe and which shall be tightly closable at all times notwithstanding the accumulations of carbon which are always met with in such a device; the provision of a valve having new and improved expedients for the removal of excess carbon; while further objects and advantages of the invention will become apparent as the description proceeds.

In the drawings accompanying and forming a part of this application I have shown certain physical forms in which my invention can be embodied although without intent to limit myself to the details of construction herein set forth. Fig. 1 illustrates a part of an automobile with a heater connected to the exhaust pipe through my improved valve; Fig. 2 is an enlarged view of the valve itself; and Figs. 3 and 4 are sectional views taken on the lines 3—3 and 4—4 respectively of Fig. 2 and looking in the direction of the arrows; Fig. 5 is a side elevation of a slightly modified valve; Fig. 6 is a plan view; and Fig. 7 shows another modification; Figs. 8 and 9 are sectional views of other modifications; and Fig. 10 is a detail view corresponding to the line 10—10 of Fig. 8.

First describing by reference characters the parts shown in Figs. 1 to 4, inclusive, 1 represents the exhaust pipe of an internal combustion engine having a notch 2 cut in one side thereof and covered by a hollow valve-body 3 secured in place by clamps 4—4. The upper part of this valve body is formed with an angularly projecting nipple 5 to which is attached the flexible hose 6 leading to the heater 7 which can be of any suitable or desired type. Just outside the boundary of the pipe 1 the interior of the body 3 is formed with a smooth walled rib 10 defining an oblong opening constituting the valve seat. Preferably this opening has a pair of straight parallel sides and rounded ends.

Mounted in the plane of this opening perpendicular of its longest dimension and at an unequal distance from its ends is a rock-shaft 12 to which is rigidly attached a flat valve-disk 13 which nearly, but not quite fills the opening. Preferably the clearance when new is at least .003 in. and not more than .008 in. If too small a clearance is attempted the expansion of the disk, caused by its rapid heating will cause it to bind, and if too much clearance is left it will take too long for the carbon to seal the leak. It is essential that the edges of this plate be sharp and square and that both its ends project beyond the shaft so that both may swing when the shaft is rocked. Carried by the rock-shaft outside of the valve body is an arm 14 to which is attached one end of the spring 15, the opposite end of which is carried by the bracket 16. The particular construction of the arm and of the bracket are not essential; in the present embodiment the arms consists of a stiff wire stuck through a hole in the shaft so as to cooperate with a stop 17 to limit the closing movement of the valve when the disk 13 has come into the plane of the rib 10, the opposite end of the wire having a hook 18 to receive one end of the spring. The bracket here shown consists of a piece of sheet metal bolted intermediate its ends to a boss 19 formed on the nipple, one end of the piece being apertured to fit loosely over the rock shaft and the other formed into an ear 20 to receive the other end of the spring. The construction of this bracket may be varied widely, but the important feature is that the spring must be of a strength greatly superior to that required merely to close the valve, in order that its power may be employed to scrape and cut the carbon deposits, thereby forcing the valve to its seat under the most adverse conditions. The bracket shown in Fig. 7, consists of a bent wire 22, set in a socket 23 formed on a part of the casing.

To operate the valve I provide a radial arm 24 connected by means of a rod 25 to a segmental bell-crank 26 secured to any suitable place in the car and operated by the handle 27. The relation of the rod and bell-crank to the arm 24 is such that the valve is opened by raising the handle 27 and closed by depressing the handle.

In the modification shown in Figs. 5 and 6 the parts 1ª to 13ª are substantially the same as the parts 1 to 13, respectively, already described. To the rock shaft 12ª is rigidly attached, as by welding, an operating arm 24ª having at its side a finger 14ª to which is attached one end of a closing spring 15ª, the other end of the spring being attached to the spring bracket 16ª. In this embodiment I have shown a chain 30 attached to the arm 24ª and projecting through a key-hole slot 31 in the floor plate 32, the end of the chain being provided with a ring 33 for easy manipulation.

The interior of such a valve always becomes coated with a dense deposit of carbon which is here utilized to seal the valve, the sharpe edges of the disk serving to scrape the same to produce an exact fit. Inasmuch as the rock shaft 12 is located intermediate the ends of the valve disk, both ends of the same have a swinging motion, producing this scraping action and preventing clogging. The end which tips into the exhaust pipe is made the longer so as to deflect into the branch pipe a portion of the exhaust gases passing therethrough, this portion being greater or smaller depending upon the size of the pipe, the length of the valve-disk, and the amount the same is tilted. It is necessary to locate all stops or abutments outside of the valve since the accretion of carbon against any such shoulder inside the same would stop the valve at the wrong point, this being averted by having the valve swing only past smooth and unimpeded surfaces. Such stops are indicated at 35, 36.

Such a valve is generally used in open condition for several months on end and again in closed condition for several months. The spring is necessarily made of sufficient strength to force the valve to cut through a heavy deposit of carbon.

In the embodiment of my invention shown in Figs. 8, 9, and 10 the valve disk 13ᵇ instead of being oblong, is circular which as before swings freely but closely within the mouth of the side branch 5. In Figs. 8 and 10 the rock shaft 12ᵇ passes to one side of the center of the disk, in order to cause the latter to dip more deeply into the exhaust pipe as shown in dotted lines in Fig. 8, whereas in Fig. 9 said rock shaft projects across the center of the disk. In these views I have shown the valve as operated by a lever 24ᵇ from which projects a finger 37 movable between fixed external stops which determine the degree of movement of the valve.

I am aware that disk valves have heretofore been used on horns and cut-outs, adapted for connection to car exhaust pipes, but none of these have had the features of construction or the requirements of operation met with in this valve. For example in a horn, it is not necessary to deflect any of the gas, but the instrument is operated entirely by reason of the internal pressure, and the valve has been located at some distance from the exhaust pipe where the carbon deposit has been small, added to which its use has been so frequent and of such short duration as to minimize the danger that any material amount of carbon would be deposited; in the same way a cut-out seldom if ever is arranged to project inside the exhaust pipe since it is sufficient for the pressure to be relieved, and a cut-out is used only infrequently and for short periods so there is little opportunity for deposition of carbon; also such a cut-out opens directly into the air, enabling escape of carbon. Besides small leaks around a cut-out are comparatively unimportant while in a heater no leakage must be permitted inasmuch as all users demand a heater that can be turned off completely.

It will be understood that I do not limit myself to the details of construction, arrangement, or design, herein set forth except as the same are specifically recited in the claims hereto annexed.

Having thus described my invention what I claim is:

1. A valve for motor car heaters comprising a casing secured to the side of an exhaust pipe, said casing having an opening adjacent to the wall of such pipe and said pipe having an opening registering with said casing, a rock shaft mounted in the plane of one of said openings and projecting transversely thereof intermediate its ends, said casing having a nipple adapted for attachment to a heater, a sharp-edged metal disk attached to said rock shaft and swinging freely in the opening wherein it is mounted, the end of said disk adapted to project into said pipe when the valve is opened, an operating arm secured to said rock shaft, means outside of said casing for positively stopping the closing movement of said valve when said disk is in the plane of said opening, an external bracket rigid with said casing, a finger movable with said rock-shaft, and a spring attached to said bracket and finger for closing said valve, said spring being of sufficient strength to force said disk to scrape away accumulated carbon from the walls of its opening.

2. A valve for motor car heaters comprising, in combination, a casing adapted to be secured to the side of an exhaust pipe, said casing having an oblong opening whose plane is substantially tangent to the pipe-wall, said opening having smooth parallel sides connected by rounded ends, and said casing having a nipple adapted for attachment to a heater, a rock shaft mounted in the plane of said opening, perpendicular to said parallel sides and at unequal distances from said ends, a sharp-edged oblong disk attached to said rock-shaft and swinging freely in said opening, the longer end of said disk adapted to project into said pipe when the valve is opened, an operating arm secured to said rock shaft, means outside of said casing for positively stopping the closing movement of said valve when said disk is in the plane of said opening, an external bracket rigid with said casing, a finger movable with said rock-shaft, and a spring attached to said bracket and finger for closing said valve, said spring being of sufficient strength to force said disk to scrape away accumulated carbon from the walls of said opening.

3. A valve for motor car heaters comprising a casing adapted to be secured to the side of an exhaust pipe, said casing having a smooth-walled opening the plane of which is approximately tangent to the pipe wall, a rock-shaft mounted in the plane of said opening transversely of the pipe, said casing having a nipple adapted for attachment to a heater, a sharp-edge metal valve-plate secured to said rock shaft inside said casing and substantially fitting said opening while swinging freely therein, an operating arm carried by said rock-shaft, a rigid bracket carried by said casing and extending beyond the limits thereof, a finger rigid with said rock-shaft, a spring attached to said bracket and finger and adapted to close said valve, and stop means outside of said casing adapted to stop the closing movement when said plate is in the plane of said opening, said casing, valve, bracket, and spring constituting a unitary assembly.

4. A valve for motor car heaters comprising a casing secured to the side of an exhaust pipe, said casing having an opening, the plane of which is approximately tangent to the pipe wall, and the pipe having an opening which registers with the casing, a rock-shaft mounted in the plane of one of said openings transversely of the pipe, said casing having a nipple adapted for attachment to a heater, a sharp-edged metal valve-plate secured to said rock shaft and substantially fitting one of said openings while swinging freely therein, an operating arm carried by said rock-shaft, a bracket secured to said casing, a finger rigid with said rock-shaft, a spring secured to said finger and to the end of said bracket and supported out of contact with said casing, said spring being arranged to close said valve, and stop-means outside of said casing adapted to arrest the closing movement of said valve when said plate lies in the plane of its opening.

5. The combination with the exhaust pipe of an internal combustion engine of a side branch leading therefrom, a radiator connected to said side branch, a sharp-edged valve disk pivoted in said side branch and swinging freely therein, the pivot axis lying in the plane of said disk, and means for forcibly swinging said valve about its pivot, the interior of said branch being free and unobstructed near said valve but adapted to accumulate solid matter there-around from the products of combustion, whereby the sharp edge of said valve cuts into said solid matter and forms therein a valve seat, and the opening being so located relatively to said exhaust pipe as to enable such valve disk when opened to project into the same in deflecting position.

6. The combination with the exhaust pipe of an internal combustion engine, of a side branch leading therefrom, a radiator connected to said side branch, a rock shaft intersecting said side branch close to and approximately tangentially of the exhaust pipe, a sharp-edged valve disk secured to said shaft inside said branch and swinging freely but rather closely therein, the interior of said branch being devoid of stops or ledges for engagement by said disk, said rock shaft being located substantially near said exhaust pipe so that said disk when opened will project into the same in deflecting position.

7. A valve for motor car heaters comprising, in combination, a casing adapted to be secured to the exhaust pipe of an internal combustion engine over an opening therein and having a side branch adapted for connection to a heater, a rock shaft pivoted transversely of said exhaust pipe at a point adjacent to said opening, stop means carried by the exterior of said casing, a member carried by said rock shaft and adapted to engage said stop means, a sharp-edged disk secured to said rock shaft in a position either to close the mouth of said casing or to project into the exhaust pipe, said rock shaft being located substantially in the plane of said disk but passing to one side of the center of said opening and said disk being secured thereto so as either to swung freely into said opening in closing relation or to project into the exhaust pipe in obstructing relation.

8. A valve for motor car heaters comprising, in combination, a casing attached to the exhaust pipe of an internal combustion engine over an opening therein and having a side branch adapted for attachment to a heater, a rock shaft traversing said opening, an operating lever secured thereto, fixed stops carried by the valve exterior to limit the movement of said shaft, and a sharp edged disk secured to said shaft and swinging freely in said opening, said disk traversing said branch when said lever is at one extreme limit of its movement and dipping into said exhaust pipe when said lever is at the other extreme limit of its movement.

In testimony whereof, I hereunto affix my signature.

CLYDE S. PELTON.